No. 773,343. Patented October 25, 1904.

UNITED STATES PATENT OFFICE.

OTTO SACHSE, OF LÜNEBURG, GERMANY, ASSIGNOR TO THE FIRM OF TRIPLEX, GESELLSCHAFT FÜR SOOLE-VERDAMPFUNG IM VACUUM M. B. H., OF LÜNEBURG, GERMANY.

PROCESS OF MAKING PURE SALT.

SPECIFICATION forming part of Letters Patent No. 773,343, dated October 25, 1904.

Application filed February 1, 1902. Serial No. 92,116. (No specimens.)

*To all whom it may concern:*

Be it known that I, OTTO SACHSE, of Lüneburg, Germany, have invented certain new and useful Improvements in the Processes of Manufacturing Pure Salt, of which the following is a specification.

This invention relates to a process of manufacture of pure common salt by evaporation of brine in vacuum-boilers.

My process is founded on the fact discovered by me that it is possible to evaporate brine in vacuum-boilers even if a considerable amount of magnesium salts is contained in the brine, provided that the gypsum is eliminated from the same.

Therefore my new process consists in, first, eliminating the difficultly-soluble salts of lime from the brine, whereas the salts of magnesium are permitted to remain in the brine, in evaporating thereafter the brine thus treated in vacuum-boilers, and in, finally, treating the resulting salt with solvents for the easily-soluble impurities or by-salts.

The invention consists, furthermore, in means for the purification of the brine from the difficultly-soluble salts of lime without precipitating at the same time the salts of magnesium. This effect is preferably obtained by carbonate of sodium, a reagent which has already been used for precipitating from heated brine the salts of lime together with the salts of magnesium. I have, however, found that when carbonate of soda is added in a quantity slightly exceeding that which corresponds to the difficultly-soluble calcium salts contained in the brine—that is to say, in a quantity slightly exceeding that which is required to substitute the element sodium for the element calcium in the calcium salts—only the calcium is precipitated in the form of calcium carbonate with a small proportion of magnesium, whereas the magnesium salts or the chief part of same are precipitated only when a larger quantity of soda is added and if the brine is heated and also stirred up.

I will now describe the performance of my invention and will assume that the brine which is to be treated consists of brine of Lüneburg which contains in each cubic meter one kilo MgO and two kilos CaO and which is nearly saturated.

In the preferred manner of carrying out my invention I add to the brine carbonate of soda in a quantity which surpasses by seven to ten per cent. the quantity of soda which is theoretically necessary for the substitution of the calcium in the calcium compounds of the brine by the sodium of the added sodium carbonate. The brine with the admixture of soda is stirred up at low or somewhat raised temperature for five to six hours, when the calcium base of the sulfate of lime is precipitated as carbonate of lime. At the same time seven to ten per cent. of the magnesium salts are likewise precipitated in the form of magnesium carbonate. Thereafter the brine is evaporated in vacuum-boilers. The resulting salt, which contains easily-soluble by-salts, is purified from these by-salts by treating it in a suitable manner—for instance, in a centrifugal apparatus with pure brine, steam, or pure water. By intensifying this treatment it is possible to obtain a nearly pure salt. For instance, the salt which is obtained in this manner by treating brine of Lüneburg generally contains 0.2 per cent. $Na_2SO_4$ and 0.05 per cent. $MgSO_4$, whereas the salt obtained in open vessels generally contains 1.2 per cent. $CaSO_4$ and 0.4 per cent. salts of magnesium (see *Agricultural Experiment Station, University of Wisconsin, A study of dairy salt,* F. W. Woll, p. 12 ff) and contains, furthermore, in most cases particles of sediment and other mechanically-admixed impurities.

The liquid which leaves the centrifugal apparatus as well as the mother-liquor may be added to the brine in purifying the same. In this way the gypsum contained in the brine can be partly eliminated before the admixture of carbonate of soda, so that a smaller proportion of this precious reagent is required, and the contents of the brine in sulfate of magnesium is utilized for eliminating part of the sulfate of lime contained in the brine. However, I may dispense with this employment of the mother-liquor.

Having thus described my invention, what I claim as new, and desire to secure by Letters Patent, is—

1. The process of manufacturing pure common salt, from brine containing salts of lime and of magnesium, which consists in eliminating the difficultly-soluble salts of lime and, at the same time, leaving the magnesium salts in unaltered condition and eliminating not more than a small part thereof, evaporating the purified brine *in vacuo*, and removing the soluble by-salts contained in the salt.

2. The process of manufacturing pure common salt, from brine containing salts of lime and of magnesium, which consists in treating the brine with carbonate of soda in quantity not greatly exceeding that required to eliminate the difficultly-soluble salts of lime and, by reason of such limited quantity, eliminating not more than a small part of the salts of magnesium, evaporating the purified brine *in vacuo*, and removing the soluble by-salts contained in the salt.

3. The process of manufacturing pure common salt, from brine containing salts of lime and of magnesium, which consists in adding to the brine carbonate of soda in a quantity slightly exceeding that which is required for the substitution of the element calcium by the element sodium, stirring the brine to precipitate the contained calcium, in the form of carbonate of calcium, together with a small part of the contained magnesium, evaporating the purified brine *in vacuo*, and removing the soluble by-salts contained in the salt.

4. The process of manufacturing pure common salt, from brine containing salts of lime and of magnesium, which consists in adding to the brine carbonate of soda in a quantity not greatly exceeding that required for the substitution of the element calcium by the element sodium, evaporating the purified brine *in vacuo*, removing the soluble by-salts contained in the salt, and adding the resulting mother-liquor, rich in sulfate of magnesium, to such quantities of brine which have not yet been treated with carbonate of soda, substantially for the purposes described.

Signed this 17th day of January, 1902, at Hamburg.

OTTO SACHSE.

Witnesses:
OTTO W. HELLMRICH,
IDA CHRIST. HAFERMANN.